Feb. 23, 1971 O. G. SIKORA 3,565,701
POST-WELD HEAT TREATED STRUCTURE WITH WELDED JOINTS
NOT REQUIRING HEAT TREATMENT
Filed Sept. 12, 1968
FIG. 1
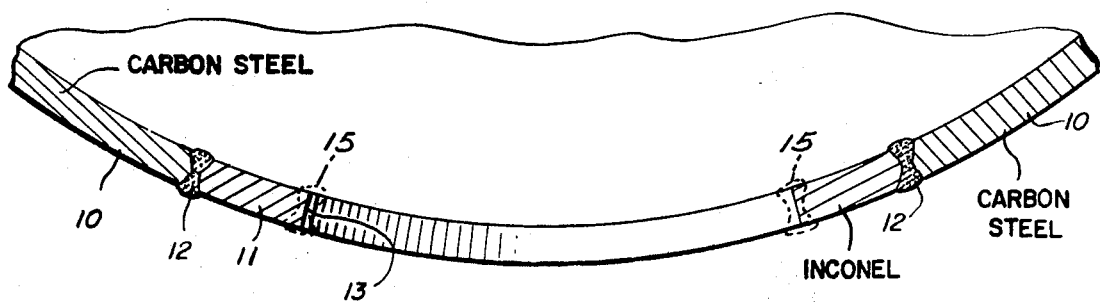
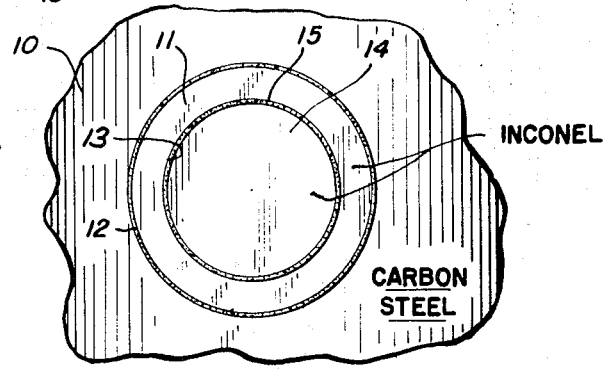
FIG. 2
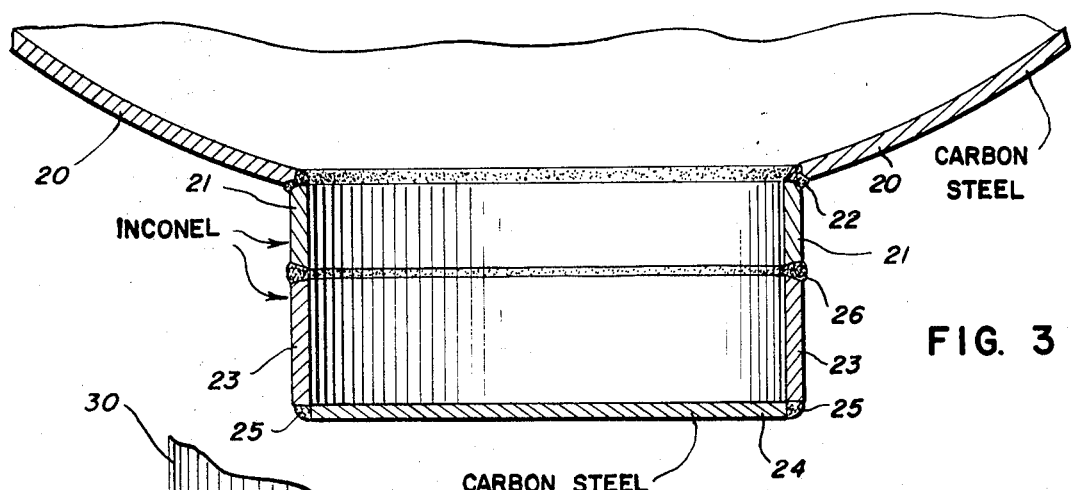
FIG. 3
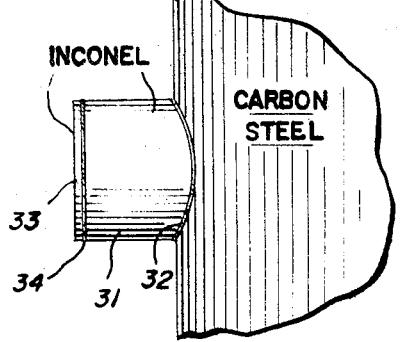
FIG. 4
INVENTOR
ORWILL GRANGER SIKORA
BY
Merriam, Marshall, Shapiro & Klose
ATTORNEYS

United States Patent Office 3,565,701
Patented Feb. 23, 1971

3,565,701
POST-WELD HEAT TREATED STRUCTURE WITH WELDED JOINTS NOT REQUIRING HEAT TREATMENT
Orwill Granger Sikora, Chicago Heights, Ill., assignor to Chicago Bridge and Iron Company, Oak Brook, Ill., a corporation of Illinois
Filed Sept. 12, 1968, Ser. No. 759,346
Int. Cl. B23p 3/00
U.S. Cl. 148—34    4 Claims

ABSTRACT OF THE DISCLOSURE

Disclosed are welded joints which do not require post-weld heat treatment used in the joining together, fabrication and closure of objects made of steel by welds which require post-weld heat treatment. The welded joints are useful in field or on-site fabrication of structures that require post-weld heat treatment followed by further welding, which cannot be post-weld heat treated for practical reasons, to complete the job.

---

The invention relates to the fabrication of objects out of metal. More particularly, it is concerned with the fabrication of objects out of steel which require post-weld heat treatment and the joining together of spaced apart edges of such steel after heat treatment by means of a weld joining together two opposing edges, surfaces or pieces of a second metal which does not require post-weld heat treatment.

Many objects are fabricated out of metals by means of welding. Welding, however, may adversely affect the ductility, brittleness, corrosion resistance and other properties of many metals. This is particularly true of welds used to join together pieces of mild carbon steel, as well as low alloy steel elements. To obtain the properties possessed by the steel before welding it is common practice, to meet engineering specifications, to post-weld heat treat such objects.

Post-weld heat treatment presents no problem where the object fabricated can be heated in shop furnaces. Many objects, however, are so large that they cannot be readily fabricated in a shop. Their final size and shape often necessitates that assembly or fabrication be effected at, or very close to, the installation site. Since such methods necessitate on the site welding of joints it is imperative that the fabricated object be post-weld heat treated to meet engineering specifications.

For convenience, on-site post-weld heat treatment may be effected prior to complete assembly. Accordingly, the post-weld heat treated elements must be subsequently joined by means which does not require a heat treatment. This would rule out the use of welded joint which would require a post-weld heat treatment. Furthermore, the very nature of the means used to effect post-weld heat treatment often requires that a subsequent joint be effected. For example, in the heat treatment of large tanks and vessels it is quite common to heat the tank or vessel by one or more luminous flames directed in through one or more openings in the wall of the tank or vessel, such as in the bottom portion thereof. This method provides excellent post-weld heat treatment. However, it requires one or more openings in the tank or vessel wall for the flame or flames to be introduced. The opening must then be closed by some other method than a weld requiring post-weld heat treatment. A closure can be effected by means of a bolted plate using an appropriate gasket but such a closure is not suitable on many tanks and vessels and sometimes is prohibited. There is thus needed a means for closing such openings by a welded joint which does not require post-weld heat treatment. Such a welded joint also is useful for joining together other structures of metal previously post-weld heat treated.

There is accordingly provided by the subject invention fabricated objects comprising a plurality of pieces of a first metal welded together and a piece of a second metal welded to spaced apart surfaces of the first metal, with all of the welds joining said metal pieces together being post-weld heat treated, and a weld joining together surfaces of the second metal to form said piece of second metal.

The invention will be described further in conjunction with the attached drawings, in which:

FIG. 1 is a sectional view of a tank wall, such as a spherical tank, showing a closure with a welded joint requiring no post-weld heat treatment;

FIG. 2 is a plan view of the closure of FIG. 1;

FIG. 3 is a sectional view through a tank or vessel wall showing another embodiment for closing an opening in a tank or vessel wall by a welded joint which does not require post-weld heat treatment; and FIG. 4 shows a closure means employing a welded joint which does not require post-weld heat treatment used on a vertically positioned cylindrical tank.

With reference to FIGS. 1 and 2 of the drawings there is shown a section of a spherical vessel such as is used for storing liquids and gases. The vessel is fabricated out of mild carbon steel or low alloy steel plate by means of welded butt joints. The construction of such vessels is well known in the art and will thus not be described in further detail.

The composition of steel plates 10 is such that the welded joints require post-weld heat treatment to obtain the characteristics of ductility, toughness, corrosion resistance and lack of brittleness. During fabrication of the vessel, a circular hole is provided in the plate 10, desirably at or near the bottom of the vessel. A metal ring 11, desirably cut from a suitable metal plate, is welded by weld 12 into the hole. The composition of metal ring 11 is such that welded joints produced therein and out of contact with metals of a different composition, do not require post-weld heat treatment. Welds in metal ring 11 must have sufficient toughness, ductility and/or corrosion resistance to render heat treatment of them unnecessary. However, the composition of metal ring 11 must also have a thermal coefficient of expansion close to that of the metal of plate 10.

Ring 11 is welded to plate 10 by weld 12 before the vessel is subjected to post-weld heat treatment. Weld 12 requires post-weld heat treatment since it joins steel plate 10, which requires heat treatment. After the post-weld heat treatment the opening 13 (FIG. 1) is closed by dished circular metal plate 14 (FIG. 2) by means of weld 15. Circular metal plate 14 is advisably of the same composition as metal ring 11 or of a composition very close thereto such that weld 15 can be effected and meet engineering specifications without the necessity of subjecting it to a post-weld heat treatment.

Advisably ring 11 and circular plate 14 are a nickel, chromium and iron alloy, one of which contains 80% nickel, 15% chromium and 5% iron and is marketed under the trade name Inconel. This alloy has a coefficient of expansion very close to that of mild carbon steel and low alloy steel. This alloy gives welds which are tough, ductile and/or corrosion resistant and do not require post-weld heat treatment.

It is obvious that while the closure structure of FIGS. 1 and 2 has been described with reference to a spherical vessel, a similar type closure can be effected in the wall of a cylindrical vessel, whether on the curved side or at a flat end thereof.

FIG. 3 illustrates another embodiment of the invention for closing an opening in a spherical vessel. The closure structure is shown positioned on the bottom of the vessel. The vessel of FIG. 3 is fabricated of mild carbon steel or low alloy steel plates 20. A hole is provided in plates 20. The hole advisably is circular although it can be oblong, i.e. elliptical, or of a polygonal shape such as a square, pentagon, or hexagon. The plates 20 used to fabricate the vessel are of such composition as to require post-weld heat treatment of the welded joints. Extending radially from the spherical vessel is cylindrical tube or ring 21 joined by weld 22 to the opening in plate 20. After tube 21 has been welded in place the vessel is subjected to post-weld heat treatment under conditions that give the desired stress relief and sought for characteristics in the welds and plates 20.

Tube 23, having a diameter and/or cross-sectional shape matching that of tube 21 has an end or cover plate 24 welded thereto by weld 25. Plate 24 can be made of any metal which can be successfully welded to tube or ring 23. Plate 24 thus can be a mild carbon steel or low alloy steel plate. However, before assembly into the vessel it is necessary that the weld 25 be post-weld heat treated since the weld, involving a steel joint, would not have sufficient toughness, ductility and/or corrosion resistance without such treatment. The tubes or rings 21 and 23 are advisably of the same composition, and advisably which are an alloy of nickel, chromium and iron such as the commercial product Inconel. Other alloy compositions can be used for tubes 21 and 23 so long as the weld 26 joining the rings together does not require post-weld heat treatment to meet engineering specifications and weld toughness, ductility, and/or corrosion resistance and the alloy has a thermal coefficient of expansion quite close to that of plate 20.

Although plate 24 has been described as being a mild carbon steel or low alloy steel plate, it can also be the same or similar alloy composition as tubes or rings 21 and 23. This would avoid the necessity of having weld 25 post-weld heat treated.

The structure of FIG. 4 is in many respects similar to that shown in FIG. 3. FIG. 4, however, shows a plate 30 forming part of a wall of a vertically positioned cylindrical tank. Wall 30 is made of mild carbon steel or low alloy steel plate. Projecting laterally from a hole in the plate 30 is metal tube 31 joined by weld 32 at the edge of the hole to plate 30. Tube 31 is a metal composition which will permit welding thereto of a metal piece of similar composition without the necessity of post-weld heat treatment. However, tubular portion 31 is welded 32 to plate 30 prior to post-weld heat treatment of the tank. After the heat treatment, cover plate 33 having essentially the same metal composition as tubular portion 31 can be welded thereto by weld 34. Weld 34 does not require post-weld heat treatment since it joins together metal pieces or elements which have sufficient ductility, toughness and/or corrosion resistance after welding to meet engineering specifications without such treatment. The elements 31 and 33 are usually made of metal alloys having compositions such as those described previously regarding elements 11, 14, 21 and 23 discussed in connection with FIGS. 1 to 3.

With reference to FIG. 2, it is also suitable to replace ring 11, cut from a metal plate, with a circular band or hoop formed from strip or bar stock of a suitable metal alloy composition.

It may sometimes be desirable, with reference to FIG. 2, to cut a disc in which ring 11 and circular plate 14 are integral therewith, to weld the disc by weld 12 to plate 10, to thereafter cut-out circular plate 14 and to weld it in place again by weld 15 after the post-weld heat treatment.

Although the invention has been described with particular regard to forming welded closure in vessels and tanks, the invention has other, more extensive uses. It can be used to join together any two or more objects which themselves require post-weld heat treatment, by means of a welded joint that does not require post-weld heat treatment. All that is necessary is that the composition of the metal alloys being joined permit welds having adequate toughness, ductility and/or corrosion resistance without post-weld heat treatment.

What is claimed is:
1. A tank or vessel fabricated of pieces of a first metal of mild carbon steel or low alloy steel welded together and a piece of a second metal having a coefficient of expansion close to that of the first metal and having sufficient toughness and ductility that welds therein do not require post-weld heat treatment welded to spaced apart edges of the first metal, all the welds joining said metal pieces together being post-weld heat treated, and a non post-weld heat treated weld joining together edges of the piece of second metal.

2. A tank or vessel according to claim 1 in which the second metal is an alloy of nickel, chromium and iron.

3. A tank or vessel fabricated of mild carbon steel or low alloy steel plates with welds joining the plates together into a wall and a closure for an opening in the wall, the closure comprising a metal ring welded to the wall at the edges of the opening, all said welds being post-weld heat treated, and a metal plate welded without post-weld heat treatment to the metal ring to close said opening, he composition of the metal ring and metal plate being such that welding of the same together gives a weld with acceptable toughness, ductility and/or corrosion resistance without a post-weld heat treatment.

4. A tank or vessel fabricated of mild carbon steel or low alloy steel plates with welds joining the plates together into a wall and a closure for an opening in the wall, the closure comprising a metal ring welded to the wall at the edges of the opening and a mild carbon steel or low alloy steel plate welded to the metal ring, all said welds being post-weld heat treated, the metal ring being of two pieces joined together by a weld without a post-weld heat treatment, the composition of the metal ring being such that welding of the two pieces together gives a weld with acceptable toughness, ductility and/or corrosion resistance without a post-weld heat treatment.

References Cited
UNITED STATES PATENTS

| | | | |
|---|---|---|---|
| 2,396,704 | 3/1946 | Kerr | 148—34 |
| 2,555,256 | 5/1951 | Tyson | 148—34 |

ALLEN B. CURTIS, Primary Examiner

A. SKAPARS, Assistant Examiner

U.S. Cl. X.R.

148—127